Dec. 15, 1931.  R. J. OLANDER  1,836,276
MANUALLY OPERATED BRAKE
Filed May 29, 1929
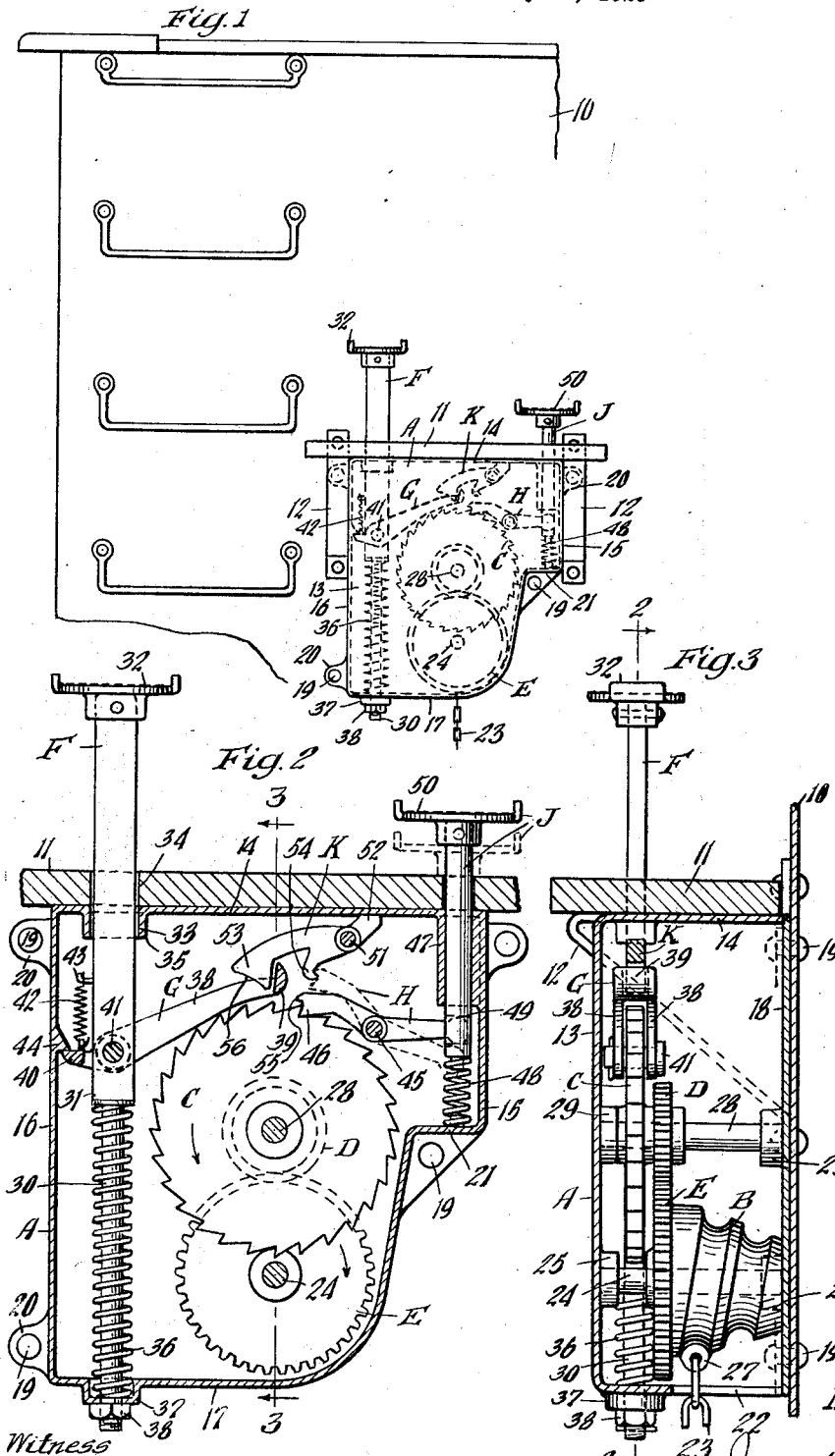
Inventor
Roland J. Olander
By Joseph Harris
His Atty.
Witness
Wm. Geiger Patented Dec. 15, 1931

1,836,276

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

MANUALLY OPERATED BRAKE

Application filed May 29, 1929. Serial No. 366,860.

This invention relates to improvements in manually operated brake mechanism for railway cars.

One object of the invention is to provide a manually operated brake mechanism for railway cars including a winding drum for the brake chain, wherein the drum is rotated through ratchet means comprising a ratchet wheel with which the drum is rotatably connected, and a cooperating pawl actuated by a manually reciprocated member.

Another object of the invention is to provide a brake mechanism of the character indicated, wherein the reciprocating operating member is provided with a foot treadle for actuating the same, and the ratchet is held against backward movement by a foot controlled locking dog.

A further object of the invention is to provide a ratchet mechanism for operating the winding drum of a brake, including a pawl cooperating with the ratchet wheel, an actuating member for the pawl movable in one direction to operate the ratchet wheel and movable in a reverse direction to retract the pawl, together with means for holding the ratchet wheel against backward rotation, wherein means is provided for automatically disengaging the pawl from the ratchet wheel upon the pawl being brought to the fully retracted position, thereby allowing free rotation of the ratchet wheel in a chain unwinding direction when the holding means is released.

Still another object of the invention is to provide a ratchet operated brake mechanism, including a ratchet wheel connected to the usual chain winding drum; a reciprocating pawl for operating the ratchet wheel; a locking dog for preventing backward movement of the ratchet wheel; and a latch member cooperating with the dog when thrown out of engagement with the ratchet wheel to maintain the same disengaged therefrom and allow free unwinding movement of the brake drum, wherein the latch member is positively disengaged from the dog through the operation of the pawl, thereby permitting return of the dog to the operative position upon the actuating means being operated in a direction to tighten the brakes.

Other objects of the invention will more clearly appear from the description and claims hereinafter following.

In the drawings, forming a part of this specification, Figure 1 is an end elevational view of a portion of a railway car illustrating my improved brake mechanism in connection therewith. Figure 2 is a vertical, transverse, sectional view through my improved hand brake mechanism corresponding substantially to the line 2—2 of Figure 3. And Figure 3 is a vertical, sectional view in a plane at right angles to the sectional view of Figure 2 and corresponding substantially to the line 3—3 of Figure 2.

In said drawings, 10 designates broadly the end portion of a railway car of the box car type. The car is provided with the usual brakeman's platform 11 which is supported by brackets 12—12 secured to the end wall of the car in any suitable manner. My improved brake mechanism is mounted adjacent the platform 11 as clearly shown in Figure 1, so that the same may be foot operated by the brakeman. My improved brake mechanism comprises broadly a casing A; a chain winding drum B; a ratchet wheel C; power multiplying gears D and E; an operating plunger F; a ratchet pawl G; a locking dog H; a locking dog operating foot treadle J and a latch member K.

The casing A is mounted directly beneath the platform 11 and between the brackets 12—12. The casing comprises a box like section having a vertical outer wall 13, a top wall 14, side walls 15 and 16 and a bottom wall 17. The casing is further provided with a detachable back wall 18 which may be secured to the box-like portion thereof in any suitable manner. In the present instance, the back wall 18 is secured to the casing by means of rivets 19—19 which extend through said back wall and ears 20—20 provided on the box-like portion of the housing. The rivets 19 preferably also extend through the end wall of the car 10 as shown in Figure 3 so as to secure the entire housing to the car body. The side wall 15 of the housing is inwardly offset as shown in Figure 2 to provide a horizontal abutment shoulder 21 intermediate the top and bottom sides of the casing, for a purpose hereinafter pointed out. The operating mechanism for the brakes is mounted within the housing and the bottom wall 17 of the housing has an opening 22 therethrough to accommodate the usual brake chain 23. The brake chain 23 is connected to the mechanism which operates the brake shoes of the car in a well known manner.

The winding drum B of the brake mechanism is rotatably mounted on a horizontally disposed shaft 24 which has the opposite ends thereof seated in bosses 25—25 projecting inwardly from the front wall 13 and back wall 18 of the housing A respectively. The drum B has the driving gear E of relatively large diameter formed integral therewith. As shown, the drum B is of conical shape and has a winding groove for the chain formed thereon, the chain being secured to the drum by means of an outstanding lug 27. As will be evident, by providing the tapered form of winding drum, the takeup of the brake chain during a winding operation will be relatively rapid at the beginning of said operation and will be wound at a slower rate during the final application of the brakes, thereby increasing the power applied to the shoes at the end of the brake tightening operation. The drum B is provided with an opening at the inner end thereof adapted to accommodate the boss 25 on the back wall 18 of the housing.

The ratchet wheel C is mounted on a shaft 28 and is freely rotatable thereon. The ratchet wheel C has the gear member D formed integral therewith, the gear D meshing with the gear E which is fixed to the drum B. The shaft 28 has the opposite ends thereof seated in the pockets provided in bosses 29—29 projecting inwardly from the front wall 13 and the back wall 18 respectively of the housing A. The ratchet wheel C is provided with the usual peripheral ratchet teeth by which the same is manually rotated in a direction to operate the chain winding drum to take up the brake chain 23.

The operating plunger F is in the form of a relatively heavy rod or bar having an upper section of substantially rectangular cross section and a bottom section 30 of substantially cylindrical cross section. An offset is provided between the cylindrical section 30 and the rectangular section of the plunger F, thereby providing an abutment shoulder 31. A foot treadle 32 is secured to the upper end of the plunger F through which the same may be operated. The rectangular section of the plunger F extends through alined openings 33 and 34 provided in the top wall 14 of the casing A and the platform 11. The opening 33 in the wall 14 is preferably reinforced by an inwardly extending flange 35 which entirely surrounds the opening and forms a guide member for the plunger. The bottom section 30 of the plunger F extends through the bottom wall 17 of the casing A and a spring 36 is interposed between the bottom wall of the casing and the abutment shoulder 31 of the plunger F, the spring surrounding the cylindrical portion 30 of said plunger. As most clearly shown in Figures 2 and 3, the bottom wall 17 adjacent the opening through which the plunger F extends is offset to provide a pocket 37 in which the bottom end of the spring 36 is seated. Upward movement of the plunger F is limited by a nut 38 which has screw threaded engagement with the bottom end of the plunger and engages the outer wall of the enlargement on the bottom wall 17 of the casing. As will be evident, the spring 36 yieldingly holds the plunger F in the raised position shown in the drawings and effects return of the plunger to that position after the same has been manually depressed.

The pawl G comprises a pair of side arms 38—38 which straddle the rectangular section of the plunger F, and connecting transverse end sections 39 and 40. The pawl is pivotally connected to the member F by a pin 41 extending through the arms 38 at a point inwardly of one end of the pawl. The connecting section 39, which is remote from the plunger F, acts as a ratchet tooth, cooperating with the teeth of the ratchet wheel to actuate the same when the plunger F is moved downwardly. A tension spring 42 is connected at one end to a pin 43 fixed to the plunger F and the other end of the spring 42 is directly connected to the end 40 of the pawl G. As will be evident, the spring 42 yieldingly urges the engaging end 39 of the pawl into operative engagement with the ratchet teeth of the ratchet wheel C. In order to automatically disengage the pawl from the ratchet member so that the latter may be freely rotated to unwind the brake chain, a stop lug 44 is provided on the wall 16 of the casing, which stop lug is engaged by the connecting section 40 of the pawl G when the plunger F is in the normal raised position, thereby lifting the engaging end 39 of the pawl free of the ratchet wheel C.

The locking dog H is pivoted between its ends on a pin 45 mounted on the outer wall 13 of the casing. The dog H is provided with a ratchet tooth 46 at the inner end thereof which cooperates with the teeth of the ratchet wheel C to prevent backward movement of the same. The opposite end of the locking dog is connected to the bar J which is in the form of a cylindrical rod guided for vertical movement with respect to the housing or casing. As most clearly shown in Figure 2, the wall 15 and the front wall 13 are provided with a thickened portion 47 at the meeting corner thereof, which thickened portion serves as a guide member for the bar J. The bar J extends through the platform 11, the same being provided with a suitable opening therefor in alinement with the guide opening of the section 47 of the housing. The bottom end of the bar J bears directly on a spring 48 interposed between the same and the ledge 21 on the wall 15 of the housing. Adjacent the bottom end, the bar J is transversely slotted as indicated at 49, the slot accommodating the extreme outer end portion of the locking dog H. The end portion of the locking dog H, which is engaged within the slot 49, is preferably rounded off as shown so as to provide a suitable bearing portion engaging the top and bottom end walls of the slot. At the upper end, the bar J is provided with a foot treadle 50, which is secured thereto in a suitable manner. As herein shown, the treadle 50 is provided with a boss into which the upper end of the bar J extends and the parts are secured together by a pin extending transversely through the bar and opposite side wall portions of the boss. In the normal position of the parts, the spring 48 holds the rod J raised as shown in Figure 2 and the dog yieldingly engaged with the teeth of the ratchet wheel C.

The latch member K is pivotally supported on a pin 51 secured to the outer wall 13 of the casing A. The latch member has a tail portion 52 which engages the top wall 14 of the housing to limit downward movement of the opposite end portion of the latch member. The main body portion of the latch K is provided with a finger 53 which normally engages over the section 39 of the pawl G and a retaining hook 54 inwardly of the finger. The hook member 54 is so positioned as to cooperate with a projecting lip 55 on the dog H. As shown in dotted lines in Figure 2, when the dog is in raised position and disengaged from the ratchet teeth of the wheel C to allow free rotation of the latter, the lip 55 will be engaged with the hook member 54, whereby the dog is maintained in said disengaged position. It will be obvious that when the latch member is lifted so as to swing the hook member out of engagement with the lip 55, the dog will be returned to the operative position by the action of the spring 48.

The latch member K is operated by the pawl G when the latter is pulled downwardly to actuate the ratchet wheel C, the section 39 of the pawl engaging the finger 53 of the latch, thereby rotating the same on its pivot. Downward movement of the finger 53, as hereinbefore pointed out, is limited by engagement of the tail portion 52 of the latch with the top wall of the housing, thereby maintaining the latch K in the position shown in Figure 2. When the pawl G is actuated by upward movement of the plunger F, the section 39 will ride underneath the finger 53, the finger being provided with an upwardly inclined outer edge portion 56 engaged by the outer portion of the section 39, which is rounded off as shown.

The operation of my improved brake mechanism in tightening the brakes is as follows: The brakeman depresses the plunger F repeatedly, thereby reciprocating the same in a vertical direction, the spring 36 effecting return movement thereof. Upon each downward movement of the plunger F, the pawl G will be forced to move therewith, thereby disengaging the section 40 of the pawl from the abutment shoulder 44 and permitting the spring 42 to urge the engaging tooth 39 of the pawl against the teeth of the ratchet wheel C. After the pawl has been engaged with the ratchet teeth, further downward movement of the plunger F will cause rotation of the ratchet wheel in a contra clockwise direction as shown in Figure 2. Inasmuch as the gear D is rotatable in unison with the ratchet wheel, the gear E engaged thereby will also be rotated, thus effecting rotation of the drum B in a direction to wind the chain 23 thereon. During the intermittent rotation of the ratchet wheel C through the operating pawl G, the spring pressed dog H will idle over the teeth of the ratchet wheel and prevent backward movement of the same by engagement with said teeth. Each time the operating plunger F is returned to the raised position shown in Figure 2, the operating pawl will be disengaged from the teeth of the ratchet wheel C by the stop lug 44 being engaged by the end 40 of the pawl. As will be evident, when the pawl is in the disengaged position, the ratchet wheel C will be free to rotate in a direction to allow unwinding of the brake chain from the drum B, provided the locking dog H is disengaged from the ratchet wheel. In order to disengage the locking dog H from the ratchet wheel, the plunger J is depressed by the foot treadle 50, thereby raising the tooth 46 out of engagement with the cooperating tooth of the ratchet wheel. When the dog is thus operated, the lip 55 thereof will engage in back of the hook member 54 of the latch K, thereby preventing return movement of the dog to the operative ratchet wheel engaging position. The dog is thus automatically locked in disengaged position and the operator after once having depressed the plunger J may remove his foot therefrom without danger of the locking dog reengaging the ratchet wheel.

When the plunger F is again operated to effect winding of the brake chain on the drum B, the latch will be automatically released through the medium of the pawl G which when reciprocated by the plunger F lifts the latch K so as to disengage the hook member 54 from the lip 55 of the dog, thereby releasing the same and permitting the return thereof to the operative position shown in full lines in Figure 2.

From the preceding description taken in connection with the drawings, it will be evident that I have provided a manually operated brake mechanism, which adds greatly to the safety of the operator as the brake is entirely foot operated, thus leaving the brakeman's hands free. In other words, the brakeman has both hands free to maintain a secure hold on the car while operating either of the foot treadles of the brakes with one foot.

I have herein shown and described what I now consider the preferred manner of carrying out my invention, but the same is merely illustrative and I contemplate all changes and modifications that come within the scope of the claims appended hereto.

I claim:

1. In a foot operated brake mechanism, the combination with a foot operated plunger reciprocable in a vertical direction; of a chain winding drum; a ratchet wheel operatively connected to the drum for driving the same; a pawl pivoted to the plunger and engageable with the ratchet wheel when the plunger is moved downwardly to rotate the same to effect operation of the drum in a chain winding direction; means for returning the plunger to elevated position; a locking dog cooperating with said ratchet wheel, means for disengaging said dog, and latch means for holding said dog out of engagement with the ratchet wheel.

2. In a brake mechanism, the combination with a chain winding drum; of a ratchet wheel operatively connected to the drum for rotating the same; a reciprocating plunger adapted to be manually moved in one direction; spring means for moving said plunger in a reverse direction; a pawl pivotally connected to the plunger and cooperating with the ratchet wheel to actuate the latter when the plunger is moved in said first named direction, thereby effecting rotation of the drum in a chain winding direction; a pivoted locking dog cooperating with said ratchet wheel to prevent backward rotation of the chain winding drum; a foot operated plunger connected to said dog for disengaging the same; and spring means for holding said dog engaged with said rachet wheel.

3. In a brake mechanism for railway cars, the combination with a chain winding drum; of a ratchet wheel operatively connected to the drum for effecting rotation thereof; a movable pawl cooperating with the ratchet wheel to rotate the same in a direction to effect winding of the brake chain on the drum; a locking dog for preventing movement of the ratchet wheel in a reverse direction, said dog being movable to an inoperative position to permit free rotation of the drum; a latch member for holding the dog in inoperative position; and means on the latch member engaged by the pawl when moved in a direction to operate the ratchet member for disengaging the latch from the dog to permit the latter to return to operative position.

In witness that I claim the foregoing I have hereunto subscribed my name this 27th day of May, 1929.

ROLAND J. OLANDER.